(12) United States Patent
Sun

(10) Patent No.: US 9,854,540 B2
(45) Date of Patent: Dec. 26, 2017

(54) MOBILE COMMUNICATION DEVICE AND RADIATED POWER ADJUSTING METHOD THEREOF

(71) Applicant: Wistron Corporation, New Taipei (TW)

(72) Inventor: Rong-Cheng Sun, New Taipei (TW)

(73) Assignee: Wistron Corporation, New Taipei (TW)

( * ) Notice: Subject to any disclaimer, the term of this patent is extended or adjusted under 35 U.S.C. 154(b) by 273 days.

(21) Appl. No.: 14/089,767

(22) Filed: Nov. 26, 2013

(65) Prior Publication Data

US 2015/0097740 A1 Apr. 9, 2015

(30) Foreign Application Priority Data

Oct. 3, 2013 (TW) .............................. 102135877 A

(51) Int. Cl.
*H01Q 1/24* (2006.01)
*H04W 52/24* (2009.01)
*H04B 17/12* (2015.01)

(52) U.S. Cl.
CPC .......... *H04W 52/246* (2013.01); *H04B 17/12* (2015.01); *H04W 52/241* (2013.01)

(58) Field of Classification Search
CPC .... G01R 29/0814; H04W 52/04; H01Q 1/245
(Continued)

(56) References Cited

U.S. PATENT DOCUMENTS

| 6,456,856 B1 * | 9/2002 | Werling | H01Q 1/243 455/129 |
| 6,934,573 B1 * | 8/2005 | Glukhovsky | A61B 1/00036 600/407 |

(Continued)

FOREIGN PATENT DOCUMENTS

| CN | 103339796 | 10/2013 |
| TW | 201225547 | 6/2012 |
| TW | M460421 | 8/2013 |

OTHER PUBLICATIONS

"Office Action of Taiwan Counterpart Application" with English translation, dated Sep. 18, 2015, p. 1-p. 9.

(Continued)

*Primary Examiner* — Linh Nguyen
(74) *Attorney, Agent, or Firm* — JCIPRNET

(57) ABSTRACT

A mobile communication device and a radiated power adjusting method thereof are provided. The mobile communication device includes an antenna, a signal measurement module, a proximity sensing module and a controlling module. The antenna receives a radio-frequency signal, and the signal measurement module is coupled to the antenna and measures a signal parameter of the radio-frequency signal. The proximity sensing module is switched between an activation mode and an original detection mode according to existence of an object, wherein a sensing conductor is configured adjacent to an adjusted antenna. The controlling module is coupled to the signal measurement module and the proximity sensing module, and the controlling module adjusts the radiated power of the adjusted antenna. When the signal parameter decreases more than a threshold value and the proximity sensing module is in the activation mode, the controlling module reduces the radiated power of the adjusted antenna.

15 Claims, 3 Drawing Sheets

(58) Field of Classification Search
USPC .............. 343/702, 703; 455/522, 575.7, 121, 455/193.1
See application file for complete search history.

(56) References Cited

U.S. PATENT DOCUMENTS

| | | | | |
|---|---|---|---|---|
| 8,466,839 | B2* | 6/2013 | Schlub | H01Q 1/243 343/702 |
| 8,515,496 | B2* | 8/2013 | Cheng | H01Q 1/243 343/702 |
| 8,577,289 | B2* | 11/2013 | Schlub | G01B 7/023 343/702 |
| 8,644,778 | B2* | 2/2014 | Leukkunen | H04B 7/0691 455/117 |
| 8,781,420 | B2* | 7/2014 | Schlub | H01Q 1/243 455/115.1 |
| 8,947,302 | B2 | 2/2015 | Caballero et al. | |
| 9,331,730 | B2* | 5/2016 | Zhang | H04B 1/3838 |
| 9,621,211 | B2* | 4/2017 | Shi | H04B 1/3838 |
| 9,621,222 | B2* | 4/2017 | Shin | H04B 1/74 |
| 2003/0013496 | A1* | 1/2003 | Kim | H04M 19/04 455/567 |
| 2003/0064761 | A1* | 4/2003 | Nevermann | H04B 1/3838 455/572 |
| 2013/0293244 | A1* | 11/2013 | Leek | G06F 3/046 324/630 |
| 2014/0155000 | A1* | 6/2014 | Erkens | H01Q 1/245 455/73 |
| 2014/0315606 | A1* | 10/2014 | You | H04B 1/3838 455/575.5 |
| 2014/0323068 | A1* | 10/2014 | Chang | H04B 1/3838 455/127.2 |
| 2014/0323141 | A1* | 10/2014 | Boos | H04B 7/02 455/452.1 |
| 2014/0333494 | A1 | 11/2014 | Huang | |
| 2015/0200444 | A1* | 7/2015 | Mercer | H01B 19/00 343/702 |
| 2015/0201385 | A1* | 7/2015 | Mercer | H04B 1/3838 455/452.1 |
| 2016/0061983 | A1* | 3/2016 | Heikura | H01Q 1/243 324/207.15 |

OTHER PUBLICATIONS

"First Office Action of China Counterpart Application" with English translation thereof, dated Nov. 28, 2016, p. 1-p. 26.

* cited by examiner

MOBILE COMMUNICATION DEVICE AND RADIATED POWER ADJUSTING METHOD THEREOF

CROSS-REFERENCE TO RELATED APPLICATION

This application claims the priority benefit of Taiwan application serial no. 102135877, filed on Oct. 3, 2013. The entirety of the above-mentioned patent application is hereby incorporated by reference herein and made a part of this specification.

BACKGROUND

Field

The disclosure relates to a mobile communication device and a radiated power adjusting method thereof, and more particularly, to a mobile communication device that adjusts a radiated power according to a parameter of a signal sensed by an antenna, and a method of adjusting the radiated power of the mobile communication device.

Description of Related Art

As wireless communication technology advances and develops, mobile communication devices have been widely used in our daily life. All mobile communication devices are equipped with an antenna for transmitting and receiving wireless signals, but electromagnetic waves radiated from the antenna may be harmful to human health. Therefore, the Federal Communications Commission (FCC) in the United States has specified a specific absorption ratio (SAR) for mobile communication devices so as to set an upper limit on the amount of energy or radiation that is allowed to be emitted from the mobile communication devices, thereby protecting human bodies from the danger of the electromagnetic waves radiated from the antenna.

The SAR refers to energy of the electromagnetic waves absorbed per unit mass per unit time. Thus, the higher the SAR, the more damage may be done to the human bodies. To satisfy the SAR value regulated by the FCC, the mobile communication devices nowadays are mostly provided with a proximity sensor at a side of the antenna. The proximity sensor includes a sensing capacitor and a sensing controller. Accordingly, when a human body approaches the antenna, variation occurs in charges of the sensing capacitor in response to the approach. In addition, the sensing controller notifies a system to reduce a radiated power of the antenna, thus preventing excessive absorption of the energy by the human body.

However, the proximity sensor often makes an erroneous determination due to environmental factors, or even cannot return to an original state in which no object is detected. If the proximity sensor fails to operate correctly, the mobile communication device is not able to properly adjust the radiated power of the antenna. Once the radiated power of the antenna cannot be properly adjusted, the reduction of the SAR cannot be duly performed. As a result, the radiated power of the antenna fails to comply with the SAR value set by the FCC.

SUMMARY OF THE INVENTION

In view of the above, the disclosure provides a mobile communication device and a radiated power adjusting method thereof. Through a proximity sensor is assisted by the measurement of signal characteristics of wireless signals, the disclosure is capable of precisely determining whether any object exists around the mobile communication device and properly adjusting a radiated power of an antenna accordingly.

The disclosure proposes a mobile communication device including an antenna, a signal measurement module, a proximity sensing module and a controlling module. The antenna receives a radio-frequency signal, and the signal measurement module is coupled to the antenna and measures a signal parameter of the radio-frequency signal. The proximity sensing module is switched between an activation mode and an original detection mode according to existence of an object, wherein a sensing conductor is configured adjacent to an adjusted antenna. The controlling module is coupled to the signal measurement module and the proximity sensing module, and adjusts a radiated power of the adjusted antenna. When a decrement of the signal parameter is larger than a threshold value and the proximity sensing module is in the activation mode, the controlling module reduces the radiated power of the adjusted antenna.

From another point of view, the disclosure proposes a radiated power adjusting method of a mobile communication device, wherein the mobile communication device includes a proximity sensing module. The radiated power adjusting method includes the following steps. A radio-frequency signal is received and a signal parameter of the radio-frequency signal is measured. The proximity sensing module is switched between an activation mode and an original detection mode according to existence of an object, wherein a sensing conductor is configured adjacent to an adjusted antenna. When a decrement of the signal parameter is larger than a threshold value and the proximity sensing module is in the activation mode, the radiated power of the adjusted antenna is reduced.

Based on the above, in the mobile communication device and the radiated power adjusting method thereof provided by the disclosure, through the assistance of the measurement of signal characteristics of wireless signals, it is possible to precisely determine whether any object exists around the mobile communication device so as to adjust the radiated power of the antenna.

To make the above features and advantages of the disclosure more comprehensible, embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

During a user's operation of a mobile communication device, an approach of the human body usually influences some parameter characteristics of signals received by an antenna. For example, a received signal strength of a radio-frequency signal may be reduced. That is to say, in addition to a proximity sensor, the antenna may also be used as a sensor for sensing whether a human body approaches. According to such feature, the invention uses signal characteristics of the radio-frequency signal received by the antenna as assistance to the proximity sensor to precisely sense the approach of the human body, thereby properly adjusting a radiated power of the antenna. In order to make the content of the invention more comprehensible, embodiments are described below as examples to prove that the invention can actually be realized. Reference will now be made in detail to the present embodiments, examples of which are illustrated in the accompanying figures. In addition, whenever possible, identical or similar reference numbers stand for identical or similar elements in the figures and the embodiments.

Figure 1:
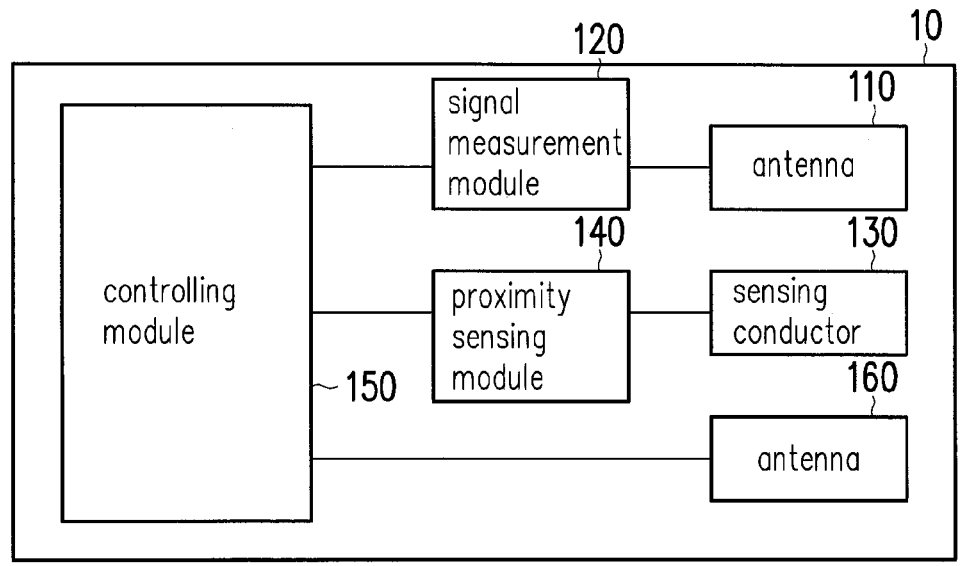
FIG. 1 is a block diagram illustrating a mobile communication device according to an embodiment of the disclosure.

FIG. 1 is a block diagram illustrating a mobile communication device according to an embodiment of the disclosure. Referring to FIG. 1, in the present embodiment, a mobile communication device 10 is applicable to an electronic device having wireless communication functions, such as mobile phone, smartphone, personal digital assistant (PDA), tablet PC, digital camera, electronic book or game console and so on. Moreover, the aforementioned electronic devices use the mobile communication device 10 to transmit or receive a wireless radio-frequency signal. Nonetheless, the disclosure is not limited thereto. The mobile communication device 10 includes an antenna 110, a signal measurement module 120, a sensing conductor 130, a proximity sensing module 140, a controlling module 150 and an antenna 160.

The antennas 110 and 160 transmit and receive a radio-frequency signal in their corresponding frequency bands. For example, an operating frequency band of the antennas 110 and 160 of the mobile communication device 10 may be adapted for transmitting and receiving a radio-frequency signal of the Long Term Evolution (LTE) system, the Worldwide Interoperability for Microwave Access (Wi-MAX) system, the Digital Television Broadcasting (DTV) system, the Global Positioning System (GPS), the Wireless Wide Area Network (WWAN) system, the Wireless Local Area Network (WLAN) system, the Ultra-Wideband (UWB) system, the Wireless Personal Area Network (WPAN) system or other wireless or mobile communication frequency band applications. In other words, the antennas 110 and 160 may be WLAN antennas, WWAN antennas, GPS antennas or other kinds of antennas. The invention is not limited thereto.

The signal measurement module 120 is coupled to the antenna 110 and measures a signal parameter of the radio-frequency signal received by the antenna 110. The signal parameter is, for example, a received signal strength indicator (RSSI), a signal-to-noise ratio (SNR) and a carrier-to-noise ratio (CNR), or a combination thereof. Specifically, the signal measurement module 120 may be a radio-frequency module for controlling the antenna 110. Therefore, when the antenna 110 receives the radio-frequency signal, the signal measurement module 120 as the radio-frequency module directly or indirectly obtains the signal parameter associated with the received signal.

For example, when the antenna 110 is a WLAN antenna, the signal measurement module 120 may be a WLAN module configured for measuring the RSSI of a WLAN signal. In addition, the antenna 110 may be a GPS antenna. Accordingly, the signal measurement module 120 may be a GPS module configured for measuring the CNR of a GPS signal. However, the disclosure is not limited thereto. The signal measurement module 120 of the disclosure is not limited to a specific radio-frequency module, and may also be a measurement module additionally installed for measuring signal characteristics. In addition, the signal measurement module 120 determines whether an decrement of the signal parameter is larger than a threshold value according to a sensing impedance between the antenna 110 and a ground plane. The sensing impedance may be a sensing capacitance between the antenna 110 and the ground plane, a sensing inductance between the antenna 110 and the ground plane, or a combination thereof, which is not limited in the invention.

The proximity sensing module 140 is switched between an activation mode and an original detection mode according to existence of an object. In short, when the proximity sensing module 140 detects the existence of the object, the proximity sensing module 140 is switched to the activation mode. When the proximity sensing module 140 does not detect the existence of the object, the proximity sensing module 140 is switched to the original detection mode so as to continue detecting whether any object approaches. In the present disclosure, the proximity sensing module 140 may be a capacitive proximity sensing module, and the capacitive proximity sensing module 140 detects the existence of the object according to the sensing capacitance formed by the sensing conductor 130. Nonetheless, the disclosure is not limited thereto. The proximity sensing module 140 of the disclosure may detect the existence of the object in other manners of proximity sensing, such as using an infrared proximity sensing module.

When the proximity sensing module 140 is a capacitive proximity sensing module, the sensing conductor 130 is regarded as a metal electrode and forms a sensing capacitor with the ground plane. The proximity sensing module 140 detects the sensing capacitance between the sensing conductor 130 and the ground plane. Accordingly, when an object approaches the sensing conductor 130, the sensing capacitance between the sensing conductor 130 and the ground plane varies. In this way, the proximity sensing module 140 detects whether any object approaches according to the variation in the sensing capacitance. That is to say, the activation mode is a mode in which the proximity sensing module 140 detects the existence of the object and generates a detection signal, while the original detection mode is a mode in which the proximity sensing module 140 does not detect the existence of the object.

It is worth noting that in the present embodiment, the sensing conductor 130 is configured adjacent to an adjusted antenna. In detail, a purpose of the proximity sensing module 140 is to detect whether a human body approaches, so that the adjusted antenna adjusts its radiated power accordingly. Thus, if the sensing conductor 130 is configured adjacent to the adjusted antenna, the proximity sensing module 140 is able to more precisely determine whether any object approaches around the adjusted antenna. For example, when the antenna 160 is the adjusted antenna, the sensing conductor 130 is configured adjacent the antenna 160, so as to detect whether any object approaches around the antenna 160, thereby properly adjusting the radiated power of the antenna 160. In another embodiment, when the antenna 110 is the adjusted antenna, the sensing conductor 130 is configured adjacent the antenna 110, so as to detect whether any object approaches around the antenna 110, thereby properly adjusting the radiated power of the antenna 110.

The controlling module 150 is coupled to the signal measurement module 120 and the proximity sensing module 140. The controlling module 150 adjusts the radiated power of the adjusted antenna according to the signal parameter measured by the signal measurement module 120 and a detection result of the proximity sensing module 140. Specifically, at the same time of detecting environmental conditions, the signal measurement module 120 and the proximity sensing module 140 notify the controlling module 150 of the measurement or detection result thereof through signal transmission. Therefore, the controlling module 150 adjusts the radiated power of the adjusted antenna according to the detection results of both the signal measurement module 120 and the proximity sensing module 140.

Figure 2:
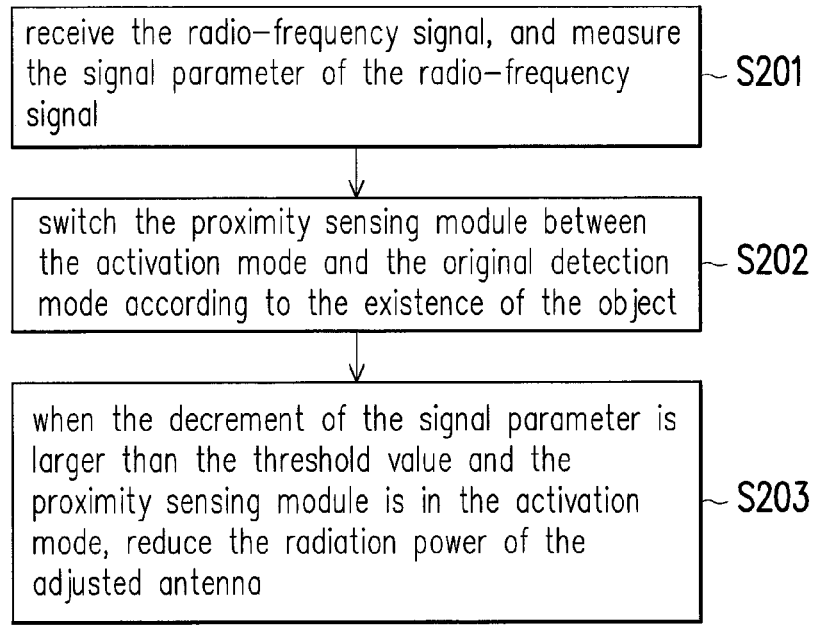
FIG. 2 is a flowchart illustrating a radiated power adjusting method according to an embodiment of the disclosure.

FIG. 2 is a flowchart illustrating a radiated power adjusting method according to an embodiment of the disclosure. The method in the present embodiment is also applicable to the mobile communication device 10 in FIG. 1. Please refer to FIGS. 1 and 2.

In step S201, the antenna 110 receives the radio-frequency signal, and the signal measurement module 120 measures the signal parameter of the radio-frequency signal. In step S202, the proximity sensing module 140 is switched between the activation mode and the original detection mode according to the existence of the object. In step S203, when the decrement of the signal parameter is larger than the threshold value and the proximity sensing module 140 is in the activation mode, the controlling module 150 reduces the radiated power of the adjusted antenna. Generally speaking, as long as there is no apparent change in the environment where the mobile communication device 10 is located, the variation of the signal parameter of the radio-frequency signal received by the mobile communication device 10 is not apparent, and a stable parameter value is presented. However, the signal parameter of the radio-frequency signal may vary due to the approach of a human body. Therefore, in the present embodiment, the decrement of the signal parameter is regarded as a detection mechanism for determining whether any human body approaches.

That is to say, the controlling module 150 of the disclosure not only determines whether any object approaches by means of the proximity sensing module 140, but also precisely determines that a human body is located around the adjusted antenna according to the variation of the signal parameter detected by the signal measurement module 120. To further describe operations of the mobile communication device 10 under other situations, the invention is described with reference to Table 1. In the table, S_var represents the decrement of the signal parameter, and TH represents the threshold value.

TABLE 1

| Signal parameter | Status of proximity sensing module | |
|---|---|---|
| | Original detection mode | Activation mode |
| S_var < TH | Adjusted to original radiated power value | Not adjusted |
| S_var ≥ TH | Not adjusted | Reduced |

Please refer to Table 1. When the decrement S_var of the signal parameter is not larger than the threshold value TH (S_var<TH), and the proximity sensing module 140 is in the original detection mode, the controlling module 150 adjusts the radiated power of the adjusted antenna to an original radiated power value. That is to say, when the decrement of the signal parameter is not apparent and the proximity sensing module 140 is in the original detection mode, the controlling module 150 determines that no human body approaches, and thus resets the radiated power of the adjusted antenna to a preset original radiated power. In addition, when the decrement S_var of the signal parameter is larger than the threshold value TH and the proximity sensing module 140 is in the original detection mode, the controlling module 150 does not adjust the radiated power of the adjusted antenna. That is to say, when the decrement S_var of the signal parameter is larger than the threshold value TH and the proximity sensing module 140 is in the original detection mode, the proximity sensing module 140 does not detect the approach of the object, and the variation of the signal parameter is probably caused by variable factors in the surrounding environment. In other words, the variation of the signal parameter at this moment is not caused by the approach of the human body. Thus the controlling module 150 does not adjust the radiated power of the adjusted antenna.

In addition, when the decrement S_var of the signal parameter is not larger than the threshold value TH and the proximity sensing module 140 is in the activation mode, the controlling module 150 does not adjust the radiated power of the adjusted antenna. It is to be noted that, in the state that the decrement S_var of the signal parameter is not larger than the threshold value TH and the proximity sensing module 140 is in the activation mode, since the decrement of the signal parameter is not larger than the threshold value, it is known that no object exists around the mobile communication device 10. Although no object approaches around the mobile communication device 10, the proximity sensing module 140 may make an erroneous determination due to environmental factors, or even cannot return to the original detection mode in which no object is detected. Thus in an embodiment of the invention, in such state (when the decrement S_var of the signal parameter is not larger than the threshold value TH and the proximity sensing module 140 is in the activation mode), the controlling module 150 generates a reset signal, thereby controlling the proximity sensing module 140 to switch from the activation mode to the original detection mode, so as to correct the sensing result of the proximity sensing module 140.

However, implementation of the disclosure is not limited to the above descriptions, and the content of the embodiments may be changed depending on actual needs. For example, when the proximity sensing module is a capacitive proximity sensing module, the sensing conductor of the disclosure may be a metal conductor near the adjusted antenna, or another antenna in the mobile communication device. That is to say, when the proximity sensing module of the disclosure is a capacitive proximity sensing module, the proximity sensing module may be switched between the activation mode and the original detection mode according to the sensing capacitance between the antenna and the ground plane. Meanwhile, the proximity sensing module may also be switched between the activation mode and the original detection mode according to a sensing capacitance between another metal conductor and the ground plane. These two situations are described in detail in the embodiments below.

Figure 3:
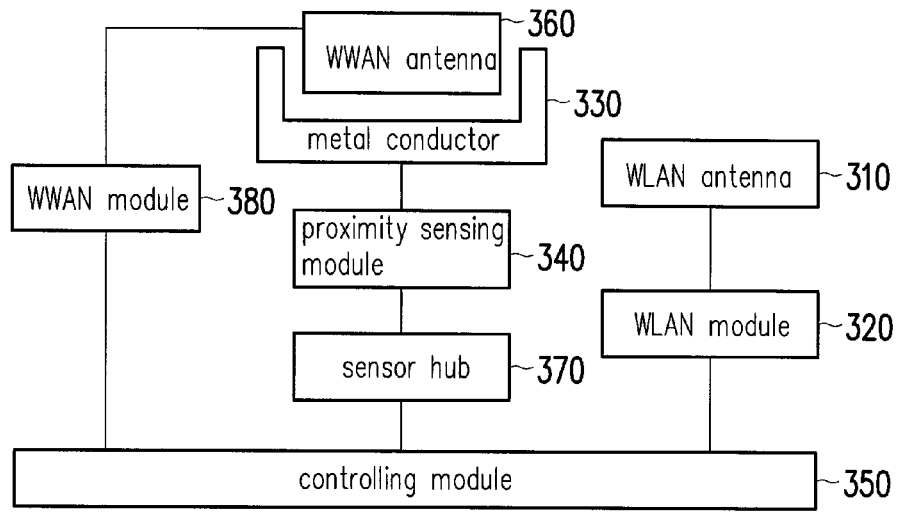
FIG. 3 is a schematic diagram illustrating a mobile communication device according to another embodiment of the disclosure.

FIG. 3 is a schematic diagram illustrating a mobile communication device according to another embodiment of the disclosure. Referring to FIG. 3, a mobile communication device 30 includes a Wireless Local Area Network (WLAN) antenna 310, a WLAN module 320, a metal conductor 330, a proximity sensing module 340, a controlling module 350, a sensor hub 370, a Wireless Wide Area Network (WWAN) antenna 360 and a WWAN module 380. Nonetheless, the present embodiment is only an exemplary way of implementation and is not intended to limit the disclosure. It is to be noted that in the present embodiment, the WLAN module 320 functions as the signal measurement module 120 in FIG. 1 and measures the signal parameter of the WLAN antenna 310. The WWAN antenna 360 is the adjusted antenna.

In the present embodiment, the metal conductor 330 functions as the sensing conductor 130 in FIG. 1. The metal conductor 330 is adjacent to and surrounds the WWAN antenna 360. For example, the metal conductor 330 is made of copper and is formed on a housing of the mobile communication device 30 by sputtering. The metal conductor 330 may also be a copper sheet and is disposed by adhesion on the housing of the mobile communication device 30 or on a substrate having the WWAN antenna 360 mounted thereon. The disclosure is not limited thereto. The proximity sensing module 340 is switched between the activation mode and the original detection mode according to a sensing capacitance between the metal conductor 330 and the ground plane. In other words, the proximity sensing module 340 detects the sensing capacitance formed between the metal conductor 330 and the ground plane, thereby determining whether any object approaches around the WWAN antenna 360. The proximity sensing module 340 transmits a detection result thereof to the controlling module 350 via the sensor hub 370. In addition, the WWAN antenna 360 is coupled to the WWAN module 380 so that the WWAN module 380 controls the WWAN antenna 360 to transmit and receive a WWAN signal.

Figure 4:
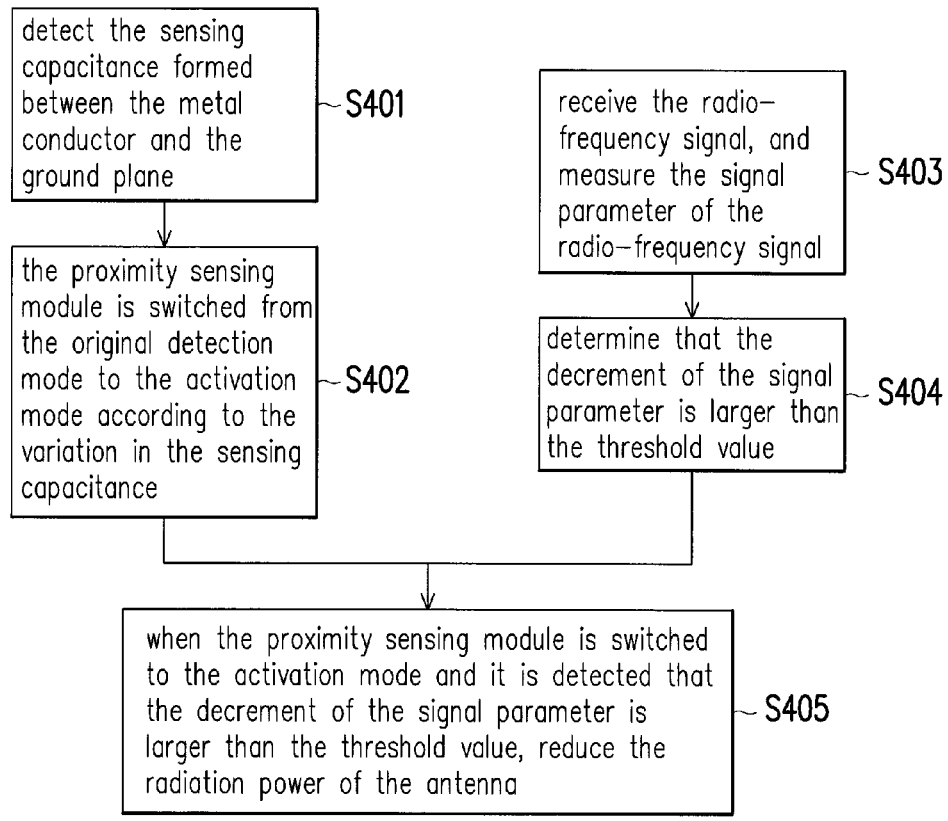
FIG. 4 is a flowchart illustrating a radiated power adjusting method according to another embodiment of the disclosure.

Based on the above, the controlling module 350 adjusts the radiated power of the WWAN antenna 360 according to variation of the signal parameter measured by the WLAN antenna 310 as well as a sensing result of a proximity sensor composed of the metal conductor 330 and the proximity sensing module 340. In order to facilitate description and understanding, FIG. 4 is a flowchart illustrating a method of adjusting a WWAN antenna according to another embodiment of the invention. Referring to both FIGS. 3 and 4, the method in the present embodiment is applicable to the aforementioned mobile communication device 30. In the following, how to reduce the radiated power of the WWAN antenna when a human body approaches is described with reference to the elements in the mobile communication device 30.

First, in step S401, the proximity sensing module 340 detects the sensing capacitance formed between the metal conductor 330 and the ground plane. When a human hand approaches the WWAN antenna 360, variation occurs in the sensing capacitance between the metal conductor 330 and the ground plane. Accordingly, in step S402, the proximity sensing module 340 is switched from the original detection mode to the activation mode according to the variation in the sensing capacitance. In short, the proximity sensing module 340 determines that an object exists around the WWAN antenna 360 according to the variation in the sensing capacitance, and notifies the controlling module 350 of the detection result by transmitting a detection signal to the controlling module 350.

Meanwhile, in step S403, the WLAN antenna 310 receives the radio-frequency signal, and the WLAN module 320 measures the signal parameter of the radio-frequency signal. That is to say, the WLAN module 320 determines whether the decrement of the signal parameter is larger than the threshold value according to a sensing impedance between the WLAN antenna 310 and the ground plane. The sensing impedance may be a sensing capacitance between the WLAN module 320 and the ground plane, a sensing inductance between the WLAN module 320 and the ground plane, or a combination thereof, which is not limited in the invention. In the present embodiment, the signal parameter is the RSSI of the WLAN signal. However, the invention is not limited thereto. In detail, at the same time when an object approaches the WWAN antenna 360, the object also approaches the WLAN antenna 310. Accordingly, the RSSI of the radio-frequency signal received by the WLAN antenna 310 is affected and varies. Based on the above, in step S404, the WLAN module 320 conducts a measurement and determines that the decrement of the signal parameter is larger than the threshold value. When the WLAN module 320 detects that the decrement of the RSSI of the radio-frequency signal is larger than the threshold value, the WLAN antenna 310 regarded as another sensor also determines that the object approaches the mobile communication device 30. When the WLAN module 320 detects that the decrement of the RSSI is larger than the threshold value, the WLAN module 320 notifies the controlling module 350 of the detection result concerning the WLAN signal characteristic by transmitting another detection signal to the controlling module 350.

It is to be noted that the threshold value is set properly depending on actual situations, and is not limited in the disclosure. Specifically, different threshold values may be set with respect to different types of signal parameters. The threshold value may be designed through experiments and tests to be a numeric value to meet actual application conditions. For example, in a case where the signal parameter is the RSSI, if the approach of the human body causes the RSSI of the radio-frequency signal received by the antenna to instantly decrease by about 3 dB, it is known through tests that the threshold value may be set to 3 dB. That is to say, when the WLAN module 320 detects that the RSSI decreases more than 3 dB, the WLAN module 320 determines that the human body exists around the WWAN antenna 360.

Then in step S405, when the proximity sensing module 340 is switched to the activation mode and the WLAN module 320 detects that the decrement of the signal parameter is larger than the threshold value, the controlling module 350 reduces the radiated power of the WWAN antenna 360. That is to say, the controlling module 350 of the invention not only determines whether any object approaches by means of the proximity sensor, but also precisely determines that the human body is located around the WWAN antenna 360 according to the variation of the signal parameter of the signal received by the WLAN antenna 310. At this moment, the controlling module 350 generates a control signal so as to control the WWAN antenna 360 to reduce its radiated power. Accordingly, the influence of an electromagnetic wave on the human body is reduced, and the SAR of the mobile communication device 30 meets the standard.

Figure 5:
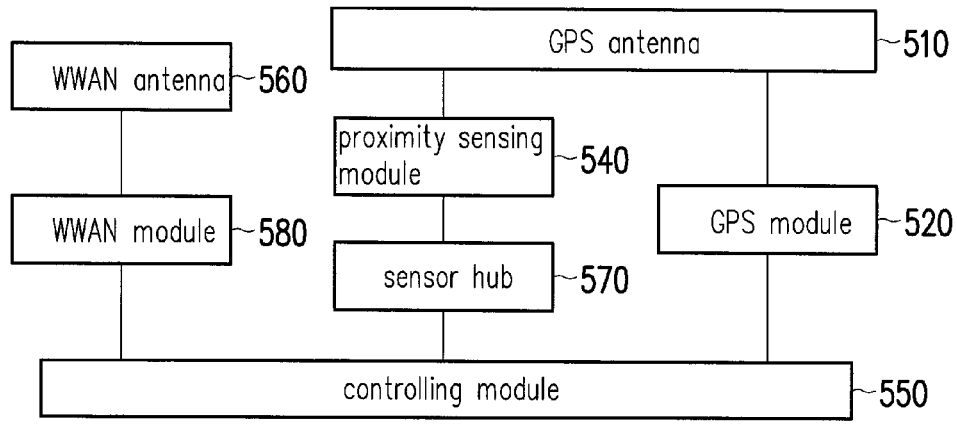
FIG. 5 is a schematic diagram illustrating a mobile communication device according to still another embodiment of the disclosure.

FIG. 5 is a schematic diagram illustrating a mobile communication device according to still another embodiment of the disclosure. Referring to FIG. 5, a mobile communication device 50 includes a Global Positioning System (GPS) antenna 510, a GPS module 520, a proximity sensing module 540, a controlling module 550, a sensor hub 570, a WWAN antenna 560 and a WWAN module 580. Nonetheless, the present embodiment is only an exemplary way of implementation and is not intended to limit the invention. It is to be noted that in the present embodiment, the GPS module 520 functions as the signal measurement module 120 in FIG. 1 and measures the signal parameter of the GPS antenna 510. The WWAN antenna 560 is the adjusted antenna.

In addition, in the present embodiment, the GPS antenna 510 is used as the sensing conductor, and the proximity sensing module 540 is switched between the activation mode and the original detection mode according to a sensing capacitance between the GPS antenna 510 and the ground plane. In detail, the GPS antenna 510 functions as the sensing conductor 130 in FIG. 1 and is adjacent to the WWAN antenna 560. In other words, the proximity sensing module 540 detects the sensing capacitance formed between the GPS antenna 510 and the ground plane, thereby determining whether any object approaches around the WWAN antenna 560. The proximity sensing module 540 transmits a detection result thereof to the controlling module 550 via the sensor hub 570. In addition, the WWAN antenna 560 is coupled to the WWAN module 580 so that the WWAN module 580 controls the WWAN antenna 560 to transmit and receive a WWAN signal.

Figure 6:
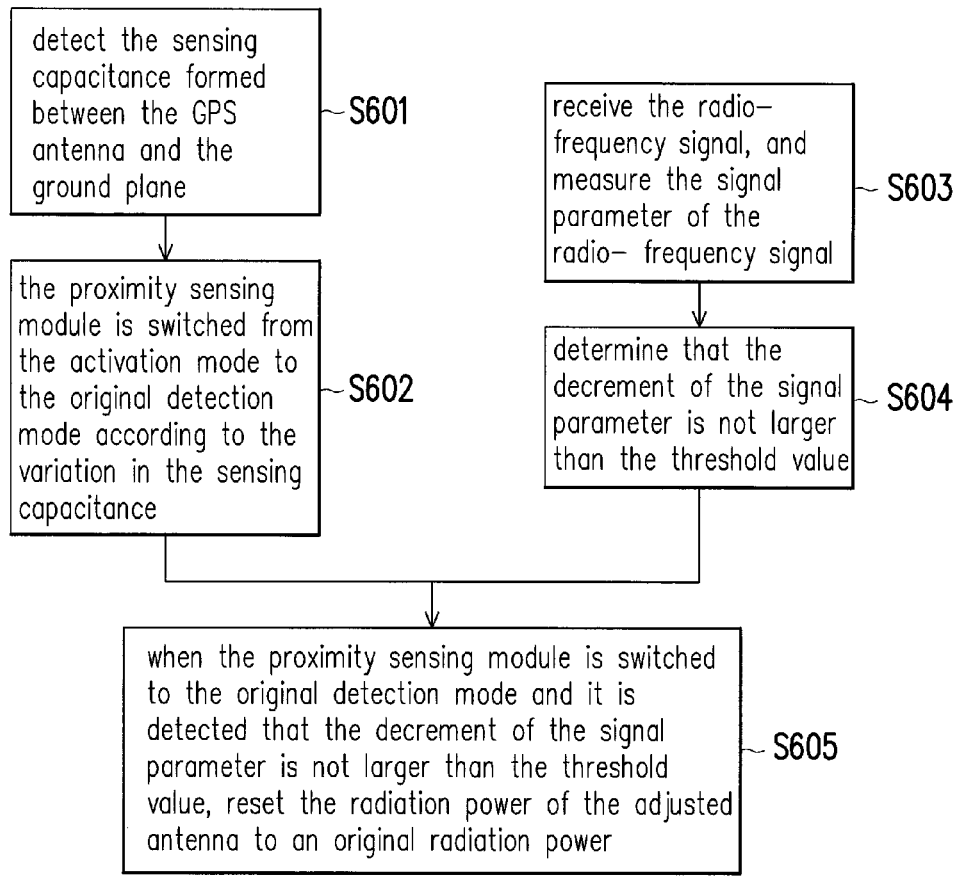
FIG. 6 is a flowchart illustrating a radiated power adjusting method according to still another embodiment of the disclosure.

Based on the above, the controlling module 550 adjusts the radiated power of the WWAN antenna 560 according to variation of the signal parameter measured by the GPS antenna 510 as well as variation in the capacitance between the GPS antenna 510 and the ground plane. In order to facilitate description and understanding, FIG. 6 is a flowchart illustrating a method of adjusting a WWAN antenna according to still another embodiment of the invention. Referring to both FIGS. 5 and 6, the method in the present embodiment is applicable to the aforementioned mobile communication device 50. In the following, how to reset the radiated power of the WWAN antenna when the human body leaves is described with reference to the elements in the mobile communication device 50.

First, in step S601, the proximity sensing module 540 detects the sensing capacitance formed between the GPS antenna 510 and the ground plane. When the human hand leaves the WWAN antenna 560, variation occurs in the sensing capacitance between the GPS antenna 510 and the ground plane. Accordingly, in step S602, the proximity sensing module 540 is switched from the activation mode to the original detection mode according to the variation in the sensing capacitance. In short, the proximity sensing module 540 determines that no object exists around the WWAN antenna 560 according to the variation in the sensing capacitance, and notifies the controlling module 550 of the detection result by transmitting a detection signal to the controlling module 550.

Meanwhile, in step S603, the GPS antenna 510 receives the radio-frequency signal, and the GPS module 520 measures the signal parameter of the radio-frequency signal. That is to say, the GPS module 520 determines whether the decrement of the signal parameter is larger than the threshold value according to a sensing impedance between the GPS antenna 510 and the ground plane. The sensing impedance may be the sensing capacitance between the GPS antenna 510 and the ground plane, a sensing inductance between the GPS antenna 510 and the ground plane, or a combination thereof, which is not limited in the invention. In the present embodiment, the signal parameter is the CNR of the GPS signal. However, the invention is not limited thereto. In detail, at the same time when the object leaves the WWAN antenna 560, the object also leaves the GPS antenna 510. Accordingly, the CNR of the radio-frequency signal received by the GPS antenna 510 is not affected by the human body and is reset to a common value. Based on the above, in step S604, the GPS module 520 conducts a measurement and determines that the decrement of the signal parameter is not larger than the threshold value. When the GPS module 520 detects that the decrement of the CNR of the radio-frequency signal is not larger than the threshold value, the GPS antenna 510 regarded as another sensor also determines that no object approaches the mobile communication device 50. Thus, when the GPS module 520 detects that the decrement of the CNR is not larger than the threshold value, the GPS module 520 notifies the controlling module 550 of the detection result concerning the GPS signal characteristic by transmitting another detection signal to the controlling module 550.

Then in step S605, when the proximity sensing module 540 is switched to the original detection mode and the GPS module 520 detects that the decrement of the signal parameter is not larger than the threshold value, the controlling module 550 resets the radiated power of the WWAN antenna 560 to an original radiated power. That is to say, the controlling module 550 of the invention not only determines whether any object approaches by means of the capacitance generated by the GPS antenna 510, but also precisely determines that the human body is not located around the WWAN antenna 560 according to the variation of the signal parameter of the signal received by the GPS antenna 510. At this moment, the controlling module 550 generates the control signal so as to control the WWAN antenna 560 to reset its radiated power. Accordingly, in the state that no human body approaches around, the mobile communication device 50 transmits and receives the radio-frequency signal normally at a preset radiated power.

In summary, in the mobile communication device and the radiated power adjusting method thereof provided by the invention, by means of the variation in characteristics of wireless signals, the proximity sensing module determines whether any object exists around the mobile communication device. Such double determination mechanism improves sensing accuracy. In addition, in cases where no object approaches, through the measurement of the signal characteristics, the proximity sensing module is reset to the original detection mode, so as to avoid being in the activation mode and performing erroneous operations. Besides, in the mobile communication device of the invention, the antenna may be used as the sensing conductor, which facilitates microminiaturization of the mobile communication device and reduction in manufacturing costs.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A mobile communication device, comprising:
   at least two antennas;
   a transceiver having a signal measurement module, coupled to one of the at least two antennas and measuring a signal parameter of a radio-frequency signal, wherein the one of the at least two antennas receives the radio-frequency signal, the radio-frequency signal is a wireless radio-frequency signal which is external to the mobile communication device, the signal parameter comprises a signal quality of the radio-frequency signal received by the one of at least two antennas;

a capacitive proximity sensing module comprising a sensing conductor and configured to detect an object through the sensing conductor according to a sensing capacitance between the sensing conductor and a ground plane, wherein the sensing conductor is configured adjacent to an adjusted antenna which is another one of the at least two antennas, the capacitive proximity sensing module operates in an activation mode in response to determining the object exists, and the capacitive proximity sensing module operates in an original mode in response to determining the object does not exist; and a controlling module, coupled to the adjusted antenna among the at least two antennas, the signal measurement module and the capacitive proximity sensing module, and configured to determine whether a decrement within a time interval of the signal parameter of the radio-frequency signal received by the one of at least two antennas is larger than a threshold value, and adjust a radiated power of the adjusted antenna in response to whether the decrement within the time interval of the signal parameter is larger than the threshold value and whether the capacitive proximity sensing module is operating in the activation mode or the original mode, wherein the controlling module reduces the radiated power of the adjusted antenna in response to the decrement within the time interval of the signal parameter of the radio-frequency signal received by the one of the at least two antennas being larger than the threshold value and the capacitive proximity sensing module determining the object exists and operating in the activation mode, wherein the controlling module adjusts the radiated power of the adjusted antenna to an original radiated power value in response to the decrement within the time interval of the signal parameter of the radio-frequency signal received by the one of the at least two antennas being not larger than the threshold value and the capacitive proximity sensing module determining the object does not exist and operating in the original mode.

2. The mobile communication device as claimed in claim 1, wherein the signal measurement module determines whether the decrement within the time interval of the signal parameter of the radio-frequency signal received by the one of the at least two antennas is larger than the threshold value according to a sensing impedance between the one of the at least two antennas and a ground plane.

3. The mobile communication device as claimed in claim 1, wherein the one of the at least two antennas is used as the sensing conductor, and the capacitive proximity sensing module is switched between the activation mode and the original mode according to the sensing capacitance between the one of the at least two antennas and a ground plane.

4. The mobile communication device as claimed in claim 1, wherein the sensing conductor is a metal conductor, and the capacitive proximity sensing module is switched between the activation mode and the original mode according to the sensing capacitance between the metal conductor and the ground plane.

5. The mobile communication device as claimed in claim 1, wherein when the decrement within the time interval of the signal parameter of the radio-frequency signal received by the one of the at least two antennas is not larger than the threshold value and the capacitive proximity sensing module is operating in the activation mode, the controlling module does not adjust the radiated power of the adjusted antenna.

6. The mobile communication device as claimed in claim 5, wherein the controlling module further generates a reset signal, and the controlling module controls the capacitive proximity sensing module to switch from the activation mode to the original mode via the reset signal.

7. The mobile communication device as claimed in claim 1, wherein when the decrement within the time interval of the signal parameter of the radio-frequency signal received by the one of the at least two antennas is larger than the threshold value and the capacitive proximity sensing module is operating in the original mode, the controlling module does not adjust the radiated power of the adjusted antenna.

8. The mobile communication device as claimed in claim 1, wherein the signal parameter of the radio-frequency signal received by the one of the at least two antennas comprises one of a received signal strength indicator (SINR), a signal-to-noise ratio (SNR) and a carrier-to-noise ratio (CNR), or a combination thereof.

9. A radiated power adjusting method of a mobile communication device, wherein the mobile communication device comprises a capacitive proximity sensing module, the radiated power adjusting method comprising:

receiving a radio-frequency signal via one of at least two antennas and measuring a signal parameter of the radio-frequency signal, wherein the radio-frequency signal is a wireless radio-frequency signal which is external to the mobile communication device, and the signal parameter comprises a signal quality of the radio-frequency signal received by the one of the at least two antennas;

detecting an object through a sensing conductor of the capacitive proximity sensing module according to a sensing capacitance between the sensing conductor and a ground plane, wherein the capacitive proximity sensing module operates in an activation mode in response to determining the object exists, and the capacitive proximity sensing module operates in an original mode in response to determining the object does not exist;

determining whether a decrement within a time interval of the signal parameter of the radio-frequency signal received by the one of at least two antennas is larger than a threshold value; and adjusting a radiated power of an adjusted antenna which is another one of the at least two antennas in response to whether the decrement within the time interval of the signal parameter is larger than a threshold value and whether the capacitive proximity sensing module operating in the activation mode or the original mode, wherein the step of adjusting the radiated power of the adjusted antenna comprises:

reducing the radiated power of the adjusted antenna in response to the decrement within the time interval of the signal parameter of the radio-frequency signal received by the one of the at least two antennas being larger than the threshold value and the capacitive proximity sensing module determining that the object exists and operating in the activation mode; and adjusting the radiated power of the adjusted antenna to an original radiated power value in response to the decrement within the time interval of the signal parameter of the radio-frequency signal received by the one of the at least two antennas being not larger than the threshold value and the capacitive proximity sensing module determining the object does not exist and operating in the original mode.

10. The radiated power adjusting method of a mobile communication device as claimed in claim 9, wherein the step of receiving the radio-frequency signal via the one of at least two antennas and measuring the signal parameter of the radio-frequency signal comprises:
determining whether the decrement within the time interval of the signal parameter of the radio-frequency signal received by the one of the at least two antennas is larger than the threshold value according to a sensing impedance between the one of the at least two antennas and a ground plane.

11. The radiated power adjusting method of a mobile communication device as claimed in claim 9, wherein the step of detecting the object through the sensing conductor of the capacitive proximity sensing module according to the sensing capacitance between the sensing conductor and the ground plane comprises:
switching the proximity sensing module between the activation mode and the original mode according to the sensing capacitance between a metal conductor and the ground plane, wherein the metal conductor is configured adjacent to the adjusted antenna.

12. The radiated power adjusting method of a mobile communication device as claimed in claim 9, further comprising:
not adjusting the radiated power of the adjusted antenna when the decrement within the time interval of the signal parameter of the radio-frequency signal received by the one of the at least two antennas is not larger than the threshold value and the capacitive proximity sensing module is operating in the activation mode.

13. The radiated power adjusting method of a mobile communication device as claimed in claim 12, further comprising generating a reset signal, and controlling the capacitive proximity sensing module to switch from the activation mode to the original mode via the reset signal.

14. The radiated power adjusting method of a mobile communication device as claimed in claim 9, further comprising not adjusting the radiated power of the adjusted antenna when the decrement within the time interval of the signal parameter of the radio-frequency signal received by the one of the at least two antennas is larger than the threshold value and the capacitive proximity sensing module is operating in the original mode.

15. The radiated power adjusting method of a mobile communication device as claimed in claim 9, wherein the signal parameter of the radio-frequency signal received by the one of the at least two antennas comprises one of a received signal strength indicator, a signal-to-noise ratio and a carrier-to-noise ratio, or a combination thereof.

* * * * *